United States Patent Office 2,979,035
Patented Apr. 11, 1961

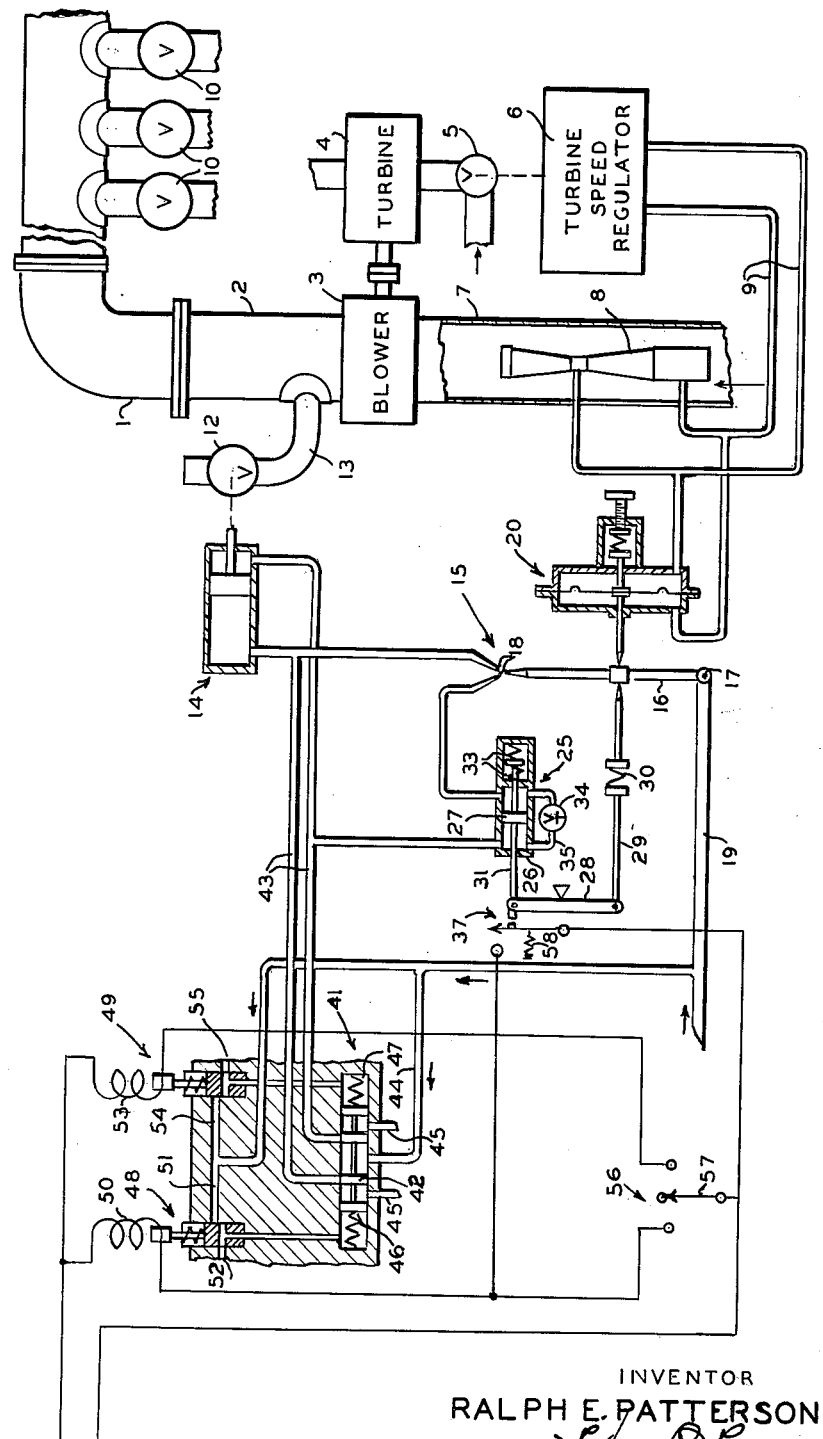
INVENTOR
RALPH E. PATTERSON
ATTORNEYS

2,979,035

AUXILIARY RELAY POWER UNIT CONTROL

Ralph E. Patterson, Chicago, Ill., assignor to Gpe Controls, Inc., a corporation of Illinois Filed Sept. 12, 1955, Ser. No. 533,580

2 Claims. (Cl. 121—41)

The present invention relates to regulation of relay power units or servomotors, typically though not necessarily in an automatic system for positioning a controlled movable member, in accordance with an error signal, as, for example, for the purpose of regulating a condition. The invention is particularly useful in a situation involving a condition-controlling device that is regulated in response to an error signal developed by the condition, and wherein there is a material and undesirable lag in response to departure of the condition from an ordered state, and the invention is well adapted to employment in a system that is provided, in more or less conventional fashion, with a secondary and/or auxiliary device that also is operable to vary the condition.

A particular field of utility of the present invention is that of supplying a compressible fluid to a demand load that is subject to sudden changes of substantial magnitude, and wherein the fluid supply is by an impeller and through a conduit having substantial capacity. Such an installation usually includes a speed control for the impeller that is responsive to a condition that varies with the demand load, to maintain impeller speed proportional to the demand load. A convenient condition that varies with demand load is volume rate of flow through the impeller. Certain types of automatically controlled power unit-fluid impeller assemblies, such as turbine driven blowers, have characteristics of impeller speed change response materially lagging a change of control signal requiring that response. Additionally certain types of fluid impellers have characteristics of unstable volume rates of delivery at rates lower than certain magnitudes. As a practical matter, the result of such a characteristic, particularly if the impeller supplies a delivery conduit of substantial capacity, with the flow to the latter at a volume rate within the unstable delivery range of the impeller, is build-up of pressure in the conduit and periodic surging in reverse direction through the impeller, a condition known as "pumping." To avoid such condition, it has become the practice to prevent reduction of delivery volume rate to the unstable range, by a dump valve connected at the delivery side of the impeller and automatically opened as decreasing demand, volume flow rate and impeller speed approach the unstable range thereby to maintain impeller operation stable. For economy the degree of opening of the dumping valve is accurately controlled relative to the volume rate of flow and therefore such dumping valve operating systems have been highly stabilized for valve positioning response that is closely proportioned to the error in permitted minimum volume flow rate, and consequently such systems are slow acting.

With the foregoing in view, it will be seen that in case the delivery conduit has substantial capacity and the impeller speed regulation has a substantially lagging response, a substantial quantity of fluid under considerable pressure may be stored in the conduit during slowdown of the impeller in response to a sudden decrease in demand and before the volume flow rate through the impeller decreases sufficiently to open the dump valve, and severe pumping may be the result.

The system of the present invention was developed to correct that specific situation, but obviously is applicable in any situation where a primary condition controller undesirably lags a corrective error signal impulse, and which system is capable of control by a second device that is capable of rapid operation in extreme situations. The latter device may be one already provided for some auxiliary control purpose, as the minimum flow rate device mentioned, and may take the form of a high speed operator for such device that is highly sensitive to and actuated under certain preselected system conditions that indicate development of an undesirable situation.

According to another aspect, the invention contemplates employment of a portion of a proportioning plus resetting type of stabilizer for instituting and terminating the auxiliary, high speed actuation of the secondary condition controlling device. This aspect of the invention is based on perception that the resetting member of such a stabilizing system acts very rapidly in response to a sudden change in the condition being controlled, as is intended to accomplish the described highly stabilized, proportional positioning of a minimum flow dump valve, and consequently provides an ideal primary control member for the auxiliary, high speed operating system for that valve.

The accompanying drawing is a schematic diagram, partly in block form, showing employment of the invention in a condition-controlling system of the type described, specifically in the form of a system for supplying air to a demand load that is subject to substantial and rapid variation, and wherein the controlled condition is varied by variation of speed of a blower driving turbine, through a relay that is responsive to volume rate of air flow through the blower.

In the drawing a supply conduit 1 is connected with the delivery coupling 2 of an impeller 3, assumed to have the mentioned characteristic of unstable delivery while volume rate of air flow through it is less than a certain lower limit of its stable operating range. Blower 3 is power driven by a variable speed power source, shown as a turbine 4, speed of which is regulated by a throttle valve 5, that is controlled by a regulator 6 that is responsive to volume rate of air flow through blower 3, for example, by response to pressure drop in air flowing through the blower intake pipe 7, as developed by a flow rate detector device such as venturi tube 8, mounted in pipe 7, and transmitted to regulator 6 by signal pressure pipes 9. The blower speed control system is so arranged that the variation in volume rate of air flow through pipe 7, in response to change in demand of load connected to pipe 1, will operate through regulator 6 to adjust throttle valve 5 and vary the speed of the turbine 4 and blower 3 in accordance with the demand and volume flow rate variations. It is assumed that this system 3, 4, 5, 6 has a characteristic of blower speed adjustment that materially lags change in volume flow rate of air through pipe 7.

A demand load of the rapidly and substantially varying kind that presents the problem herein solved, is typified by a battery of forced draft furnaces, wherein air supply to each furnace is controlled by gate valves, such as at 10, that may be opened or shut with great rapidity as necessitated by operation requirements of the furnaces.

In a system such as that so far described, and the arrangement of which is conventional, it is usual practice to provide for prevention of decrease in volume flow rate through the impeller to or below the limit of stable blower operation, by means of a so-called "minium flow rate regulator." A typical system arrangement is shown, comprising a dumping valve 12 in a bleeder pipe 13 connected to the delivery coupling 2 of blower 3, and that is adjustable to vary rate of bleed discharge of air from coupling 2, thereby to maintain rate of air flow through blower 3 above the lower limit of the stable operating range. An automatic system that positions dump valve 12 appropriately to regulate the bleed flow for that purpose includes a power unit shown as a hydraulic cylinder and piston assembly 14 coupled to operate valve 12 and that is position controlled by a hydraulic relay regulator, designated generally 15, that responds to volume flow rate through blower 3 to operate unit 14 for the indicated purpose.

In the type of minimum flow rate regulator system disclosed, and as heretofore used, the regulator comprises a jet pipe 16 that, in well known fashion, swings about a pivot axis 17, in the directions of spacing of a pair of closely adjacent receiver ports 18, so that a stream of pressurized liquid, supplied through a pipe 19 and delivered axially of jet pipe 16 and through an orifice in its end, develops pressures in the respective ports 18, difference in magnitudes of which is a function of the angular position of the jet pipe and degrees of registration of its discharge orifice with the different ports 18. These receiver port pressures are transmitted to opposite ends of the cylinder of power unit 14, so that the piston of the latter moves in a direction corresponding to the receiver port 18 in which lower pressure is developed and therefore to sense of displacement of jet pipe 16 from a neutral position of equal registration with the ports 18 and consequent development of equal pressures in them.

Jet pipe 16 is positioned in correspondence to flow rate through blower 3 by expansible chamber motor means, shown as a diaphragm assembly 20, the two chambers of which respectively are connected to the different signal pipes 9. The arrangement is such that as decreasing volume rate of flow through blower 3 approaches the lower limit of stable blower delivery, regulator 15 acts to open valve 12, and maintains valve 12 open to whatever degree is necessary to maintain blower air delivery rate above the indicated lower limit, in spite of demand for a lower delivery rate and the resultant tendency of response of system 6, 5, 4 to correspondingly decrease blower speed.

Since bleed air represents power loss, the minimum flow rate regulator system is highly stabilized against overcorrection and hunting, in the system illustrated by a stabilizer 25 of known arrangement. This stabilizer comprises a cylinder 26 the opposite ends of which are connected to one of the regulator receiver ports 18 and one end of the cylinder of the power unit 14. Piston 27 of stabilizer 25 is moved from a neutral position, as in the center of cylinder 26, to a distance that corresponds to volume of liquid flowing in either direction between one of the receiver ports 18 and the cylinder of power unit 14, in a direction that corresponds to sense of deflection of jet pipe 16 from its zero position, and through a distance corresponding to magnitude of that deflection. A mechanical system shown as a lever 28, a link 29, and stroke-to-force translating spring 30 connects the output member, piston rod 31 of stabilizer 25 to jet pipe 16, so that the latter is returned toward its neutral position during execution of strokes of the pistons of stabilizer 25 and power unit 14 in response to the jet pipe deflection, whereby lengths of those strokes are rendered proportional to the degree of deflection of the jet pipe that controls them. As the jet pipe 16 is returned to its neutral position and rate of fluid delivery to the cylinders of units 25 and 14 consequently decreases, the stabilizer piston 27 is returned to its zero or neutral position by a centering spring arrangement 33 and at a rate determined by the setting of a throttle valve 34 in a bypass 35 that interconnects the ends of cylinder 26. Stabilizer 25 imparts a proportional plus reset operating characteristic to the relay sytem 15, 25, 14. The stabilizer device is disclosed by United States patent to Wunsch, No. 1,959,889, dated May 22, 1934.

As indicated, the lagging blower speed control characteristic of the system 6, 5, 4, the capacity of conduit 1 and delivery coupling 2, the highly stabilized, slow action of the minimum flow rate system 15, 25, 14, and the rapid and substantial variation in demand load tend to produce "pumping" as a consequence of rapid decrease in the load, as by sudden closing of a valve 10, particularly if pipe 1 has considerable length and capacity.

The present invention resides in providing the dump valve-positioning power unit 14, with an auxiliary control system that responds with great rapidity and high sensitivity to decrease in demand load, to override the highly stabilized, relatively slow positioning control exerted by the minimum flow rate regulator system.

It is a characteristic of stabilizer 25, that is inherent due to the high degree of stabilizing effect that it exerts by moving jet pipe 16 toward its zero position, that piston 27 moves rapidly in response to jet pipe deflection, and to a distance that is proportioned to degree of such deflection. The jet pipe and its control system 8, 20, are very sensitive to variation in volume rate of flow through impeller 3, and the jet pipe and consequently stabilizer piston 27 is rapidly moved to positions that correspond to magnitude in volume flow rate through the impeller. The particular form of the invention shown in the drawing involves positioning of the control member of the auxiliary regulator for operating power unit 14 to open dump valve 12, for actuation by stabilizer piston 27, when the latter reaches a predetermined position corresponding to decrease in demand load coupled with a blower delivery rate of preselected magnitude that indicate a "pumping" creating condition.

The auxiliary control member is shown as an electric switch 37, that is positioned for contact by the stabilizer piston rod 31, and so located that its contact making and breaking is effected by the rod 31, respectively to activate and deactivate the auxiliary power unit driving system as piston 27 arrives at the preselected position and leaves it in returning toward its zero position. When the auxiliary control system is thus activated its overrides control of power unit 14 by the normal proportional minimum flow rate regulating system, and drives power unit 14 at a maximum speed in the direction to open dump valve 12. When the auxiliary system is deactivated, control of power unit 14 is restored to the proportional system, regulator 15 and stabilizer 25, and valve 12 thereafter is positioned to maintain bleed flow at the volume rate necessary to maintain speed of blower 3 sufficient for delivery at a rate above the lower limit of its stable delivery range.

The particular arrangement of the auxiliary, antipumping power unit control system is based on the arrangements disclosed in United States patent to Jacques, No. 2,635,584, dated April 21, 1953, a simplified version thereof being shown in the drawing herein. To provide for manual control of dump valve 12, a transfer valve assembly 41 is provided. This valve includes a spool body 42 that is spring biased to a cutoff condition blocking communication between each of a pair of service lines 43, and supply and exhaust lines 44, 45. The spool body is movable from its cutoff position, in opposite directions respectively, to connect the different service lines 43 in opposite senses with the supply and exhaust lines 44, 45, respectively by connecting in opposite senses the different ones of a pair of hydraulic piston-cylinder actuators 46, 47, with pressurized fluid supply and exhaust, equalization of fluid pressures delivered to them by connecting both to the same one of supply and exhaust permitting body 42 to be spring moved to its cutoff position. Such connection of actuators 46, 47, is controlled by a pair of spring biased solenoid actuated valves 48, 49. Energization and deenergization of the solenoid winding 50 of valve 48 serves to connect actuator 46 respectively with a supply line 51 and with an exhaust line 52, and energization and deenergization of the solenoid winding 53 of valve 49 serve respectively to connect actuator 47 with a supply line 54 and an exhaust line 55. In the senses shown in the drawing, energization of solenoids 50, 53 respectively serve, through senses of connection of service lines 43 with the cylinder ends of power unit 14, to open and to close dump valve 12. These valve actuations may be effected from a remote location 56 by appropriate adjustment of a triple throw selector switch 57, by means of which either solenoid winding 50 or 53 may be energized respectively to open or close valve 12, overriding control by jet pipe 16, or both may be deenergized to place the jet pipe in control.

Switch 37 is connected parallel to the throw of switch 57, that is effective to open valve 12 when closed, and closing of switch 37 serves to energize solenoid 50, which energization, as stated, results in operation of power unit 14 to open valve 12. The rate of such operation is determined solely by volume rate of delivery through supply line 44 and transfer valve 41, the latter being operated as an "on-off" controller. Switch 37 is biased by a spring 58 to its auxiliary system-deactivating position, open in the specific arrangement shown, so that when stabilizer piston 27 and rod 31 leave their switch closing condition during their return to zero condition, switch 37 will deactivate the auxiliary control system and restore operation of power unit 14 to the normal minimum flow regulation proportional control by jet pipe 16 and stabilizer 25.

From the above it will be seen that the system herein disclosed provides for exerting upon a condition that is subjected to control by a primary controller device, specifically blower 3, turbine 4 and turbine speed regulator 6, an auxiliary control for emergency operation upon variation of the condition in undesirable fashion; first, by an auxiliary emergency control that responds to that type of condition variation and comprising the regulator 15, stabilizer 25, and the system 37, 41, and disregarding the minimum flow rate regulating function of regulator 15 and stabilizer 25, which function could be eliminated; and second, by an auxiliary emergency control that overrides the normal power unit control functioning of a secondary condition-control system such as the regulator 15 and stabilizer 25 to effect emergency operation of the secondary condition controller, 14, 12.

The concepts, types of system arrangement and modes of operation of systems falling within the invention will be understood from the disclosure herein, it being understood that the specific form shown and described is purely exemplary, and that the scope of the invention is to be ascertained solely from the appended claims.

I claim:

1. An auxiliary control device for a relay regulator that includes a primary control member movable in response to changes in a control signal to vary rate of delivery of operating energy to a power unit; said device comprising a supplemental system for delivering operating energy to a power unit controlled by said regulator and including control means convertible between first and second conditions respectively establishing and preventing energy delivery by said system and provided with a control element that is movable between first and second positions respectively to convert said control means to its said first and second conditions, a motor device including a part movable by operating energy delivered in response to movement of said primary control member, means biasing said part to a zero position, and means actuated by said part in arriving at and departing from a position spaced a preselected distance from its zero position respectively to move said control element to its said first and second positions.

2. An auxiliary control device for a proportional plus reset regulator that includes a primary control member movable in response to changes in a control signal and having a neutral position wherein and away from which respectively it is effective to prevent delivery and to effect delivery of operating energy for consumption by a power unit, and a stabilizing device provided with a part that is movable from a zero position in response to movements of said control member, and said part being connected with said member for moving it toward its neutral position as the part moves away from its zero position, and biasing means for restoring said part to its zero position; said auxiliary device comprising a supplemental system for delivering operating energy to a power unit controlled by said regulator and including control means convertible between first and second conditions respectively establishing and preventing energy delivery by said system and provided with a control element that is movable between first and second positions respectively to convert said control means to its said first and second conditions, and means actuated by said stabilizer part to move said element to its first and second positions respectively as said part moves to and from a position spaced at a preselected distance from its zero position.

References Cited in the file of this patent
UNITED STATES PATENTS

| | | |
|---|---|---|
| 1,160,562 | Banner | Nov. 16, 1915 |
| 1,280,843 | Rice | Oct. 8, 1918 |
| 1,325,255 | Lowenstein | Dec. 16, 1919 |
| 1,510,903 | Riesner | Oct. 7, 1924 |
| 1,659,752 | Thoma | Feb. 21, 1928 |
| 1,959,889 | Wunsch | May 22, 1934 |
| 2,007,777 | Standerwick | July 9, 1935 |
| 2,172,315 | Blasig | Sept. 5, 1939 |
| 2,312,464 | Ziebolz | Mar. 2, 1943 |
| 2,377,300 | Pray | May 29, 1945 |
| 2,478,423 | Ponomareff et al. | Aug. 9, 1949 |

FOREIGN PATENTS

| | | |
|---|---|---|
| 72,595 | Switzerland | 1913 |